April 23, 1935.　　B. C. WOODFORD　　1,999,012
TRAMPER
Filed Oct. 23, 1933　　2 Sheets-Sheet 1

Inventor
Bronson C. Woodford
By Jack A. Ashley
Attorney

April 23, 1935.  B. C. WOODFORD  1,999,012
TRAMPER
Filed Oct. 23, 1933    2 Sheets-Sheet 2

Inventor
Bronson C. Woodford
By Jack A. Achley
Attorney

Patented Apr. 23, 1935

1,999,012

UNITED STATES PATENT OFFICE 1,999,012

TRAMPER

Bronson C. Woodford, Dallas, Tex., assignor to The Murray Company, Dallas, Tex., a corporation of Texas Application October 23, 1933, Serial No. 694,810

9 Claims. (Cl. 100—25)

This invention relates to new and useful improvements in trampers.

One object of the invention is to provide an improved tramper feeder.

A particular object of the invention is to provide a tramper feeding device for feeding cotton or other material into the tramper box arranged to be operated only when the plunger is at the extreme upper end of its stroke, whereby a definite cycle of feeding is provided within a predetermined portion of the plunger stroke and also whereby during all remaining portions of the plunger stroke, both the feeding and the mechanism therefore, are dormant.

A further object of the invention is to provide a tramper feeder having means actuated by the plunger for setting the feeding device in motion, together with a brake arranged to be automatically applied when said means is released by the plunger.

An important object of the invention is to eliminate clutches and the like by providing a continuously driven belt for actuating a feeder and a belt tightener mounted to be operated by the tramper plunger to set the feeder in motion, during a portion of the stroke of said plunger, thus making for simplicity of structure and operation as well as controlled feeding.

A further object of the invention is to provide a feeder which may readily be attached to a previously constructed tramper without altering the construction of said tramper, thus permitting the feeder to be attached to trampers already installed in cotton gins.

A construction designed to carry out the invention will be hereinafter described together with other features of the invention.

The invention will be more readily understood from a reading of the following specification and by reference to the accompanying drawings in which an example of the invention is shown, and wherein.

Figures 1, 2:
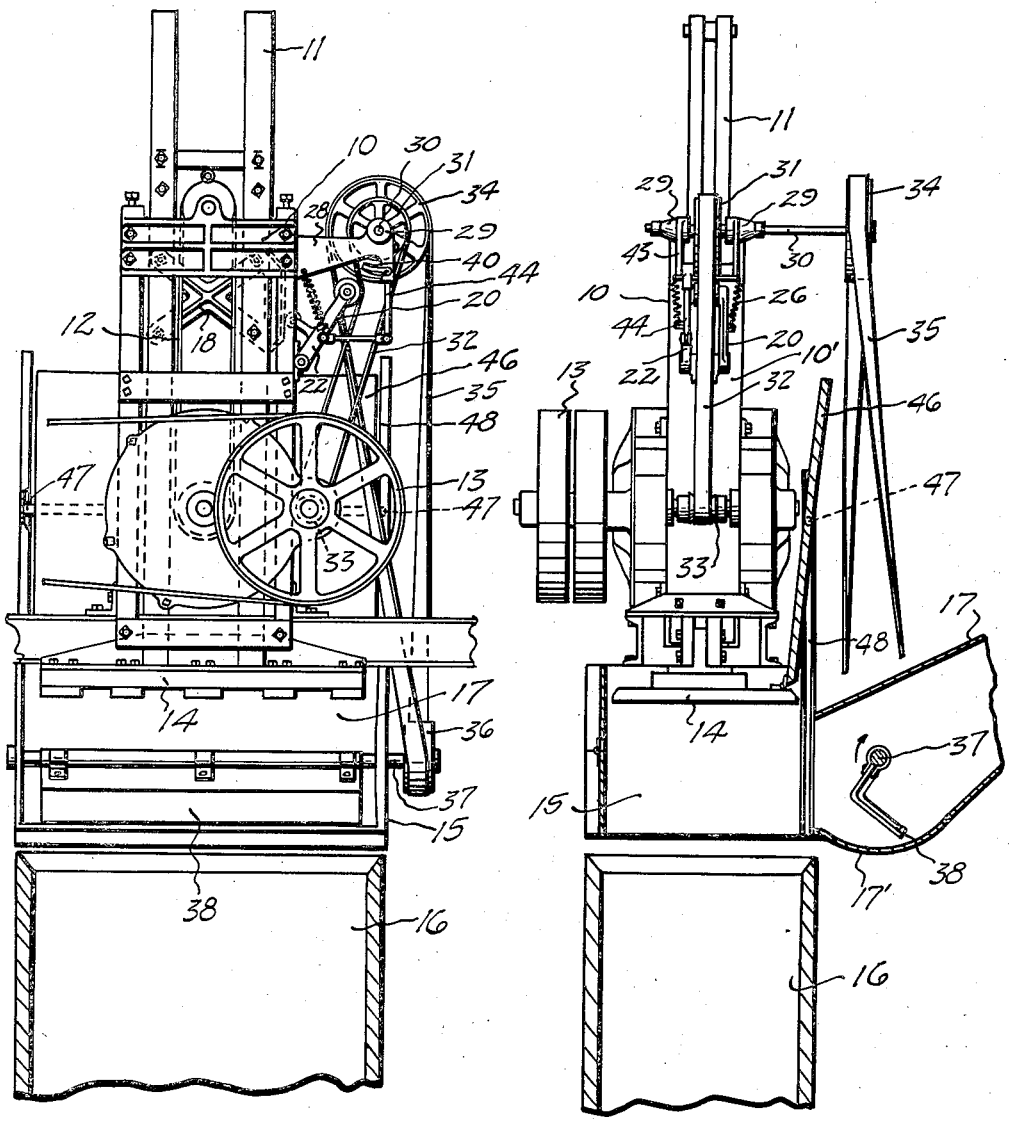
Figure 1 is a front view, partly in elevation and partly in section, of a tramper equipped with a feeder constructed in accordance with the invention.
Figure 2 is a side view of the same.

In the drawings, the numeral 10 designates a tramper frame having the usual tramper plunger 11 vertically slidable therein. The plunger may be operated by any suitable means and I have shown it driven by a chain 12 which has connection with the main drive pulley 13. On the downstroke, the plunger head 14 travels downwardly within the usual tramper hopper 15 and press box 16, which are positioned beneath the tramper frame. The rear side of the hopper 15 is open and an inclined feed chute 17 leads upwardly therefrom, whereby cotton may be readily fed into the hopper (Figure 2). The foregoing description is merely one of a tramper of the usual type and the details of the same are unessential to the invention and may be of any desired construction.

Figure 3:
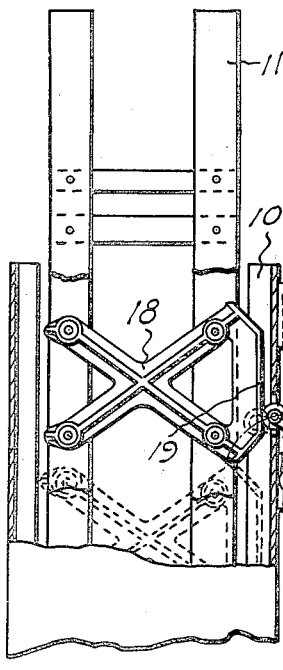
Figure 3 is a detail of the feeder operating means.

In carrying out my invention, a cross bracket 18 (Figure 3) is rigidly secured to the tramper plunger 11. The bracket has a shoe 19, preferably made integral, at one side thereof and this shoe is positioned contiguous to one of the frame channels 10'. It is obvious that, since the shoe is fastened to the plunger 11, it will travel vertically of the channel 10' when the plunger is operated.

A belt tightener 20 is pivoted in a suitable bearing bracket 21 to the outside of the frame channel 10' near the upper end thereof. The belt tightener includes a pair of upwardly inclined levers 22 which have inwardly extending arms 23 integral therewith. A roller 22' is carried by the outer ends of the levers 22. The arms 23 extend through a slot 24 in the side of the channel 10' and carry a roller 25 between their ends. A pair of springs 26, each having one end secured to one of the levers 22 and its opposite end secured to a hanger 28 which is fastened to the upper end of the channel 10', normally hold the roller 25 within the tramper frame in the path of the shoe 19, as shown in dotted lines in Figure 3. As the tramper plunger 11 reciprocates, the shoe 19 will engage the roller 25 to swing the belt tightener 20 outwardly.

Figure 4:
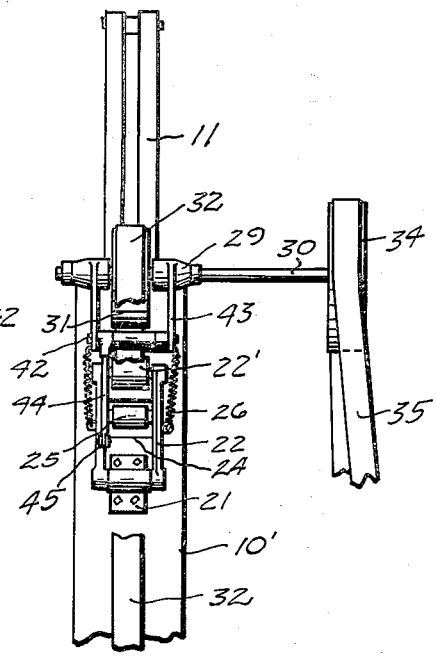
Figure 4 is a side view of the same.
Figure 5:
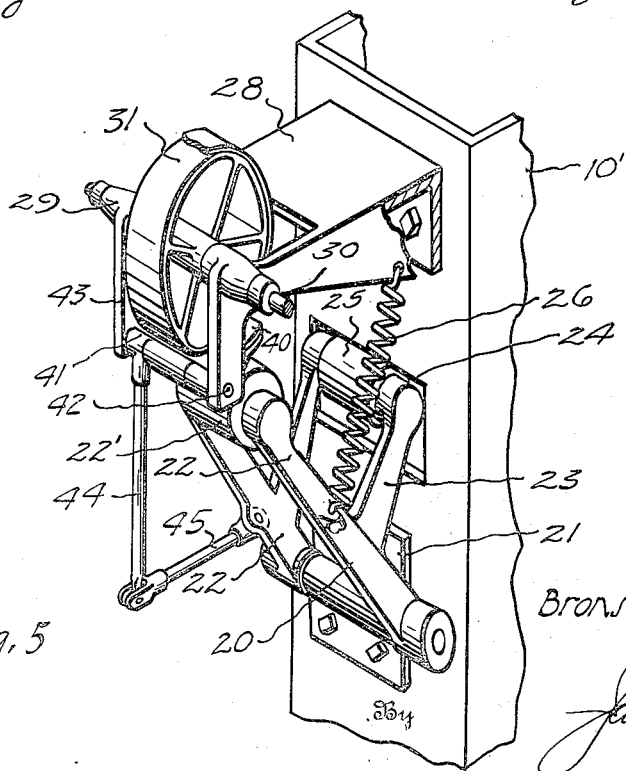
Figure 5 is a perspective view of said operating means.

The outer end of the hanger 28 is bifurcated and is provided with bearings 29 in which one end of a shaft 30 is journaled. A pulley 31 is fastened on the shaft and is rotatable therewith. An endless belt 32 passes over the face of the pulley and extends downwardly and around a small pulley 33 which is secured on the shaft of the drive pulley 13. This belt is normally loose on both pulleys so that motion will not be imparted from one pulley to the other. By observing Figures 3 and 4 it will be seen that the roller 22' is constantly in engagement with the belt 32 but the springs 26 prevent said roller from exerting sufficient pressure against the belt to tighten the same. When the belt tightener is swung outwardly by reason of the shoe 19 on the plunger 11, engaging the roller 25 carried by the arms 23 the roller 22' will swing against said belt to exert a pressure thereon, to tighten the same on the pulleys 31 and 33, whereby motion is transmitted from the pulley 33 to the pulley 31. So long as the shoe 19 engages the roller 25, the belt 32 remains tight and the pulley 31 is rotated to revolve the shaft 30. However, as soon as the shoe disengages the roller 25, the springs 26 swing the belt tightener inwardly and the pressure on the belt 32 is released, whereby the motion from the pulley 33 on the drive shaft is not transmitted to the pulley 31.

For assuring an immediate stop of the pulley 31 after the belt tightener returns to a normal position to loosen the belt 32, a brake shoe 40 is provided. The shoe is carried by a brake lever 41 which is pivotally mounted to swing on a rocker shaft 42 supported in the lower ends of arms 43 which are integral with, and depend from the bearings 29 on the end of the hanger 28. A lever 44 is fastened to the outer end of the brake lever 41 at substantially a right angle thereto, whereby swinging of the former will swing the latter to engage the brake shoe 40 with the face of the pulley 31.

The lower end of the lever 44 is pivotally connected to a link 45 which has its other end pivoted to one of the levers 22 of the belt tightener. It is obvious that when the belt tightener is in its normal position the link 45 will swing the lower end of the lever 44 inwardly which will swing the brake shoe 40 into engagement with the pulley 31. When the belt tightener is swung outwardly, the lever 44 is also swung outwardly to disengage the shoe 40 from the pulley.

The shaft 30 on which the pulley 31 is fastened is extended outwardly from one side of the hanger 28 and has a large pulley 34 secured on this outer end, whereby rotation of the pulley 31 will rotate the pulley 34. The latter pulley has connection through an endless belt 35, with a small drive pulley 36 mounted on the outer end of a shaft 37. The shaft 37 extends transversely of, and is journaled in the lower end of the inclined chute 17. A right angular kicker blade 38 is secured on the shaft 37, being rotatable therewith.

As shown in Figures 1 and 2, the kicker blade extends substantially the full width of the chute and is arranged to rotate in a counter clockwise direction in the boot 17' of said chute. Thus, as the cotton falls down the chute into the boot of the same the kicker blade will rotate to sweep the cotton into the tramper hopper 15 and press box 16. It is pointed out that the blade rotates only when the pulleys 31 and 34 are rotated to drive the pulley 36, and the rotation of the pulleys 31 and 34 are controlled by the pressure exerted by the roller 22' of the belt tightener on the belt 32. As has been explained, the belt tightener is swung to exert pressure on the belt 32 only when the shoe 19 engages the roller 25 thereof. Thus, it will be seen that so long as the shoe 19 is in engagement with roller 25 the kicker 38 will be rotated. As soon as the shoe passes the roller, the belt tightener is returned to its normal position (dotted lines, Figure 3) and the kicker pulley is stopped.

The shoe 19 which is made integral with the cross bracket 18 fastened on the plunger 11, is positioned so that it will engage the roller 25 of the belt tightener when the plunger head reaches a point where it will clear the kicker blade on the up stroke of said plunger. From this time until the plunger reaches its topmost position and starts down the shoe is still in engagement with the roller and the belt tightener is swung outwardly whereby the pulleys 31, 34 and 36 are being rotated. Then as the plunger head reaches a point within the hopper where it would interfere with the operation of the kicker blade on the downstroke, the shoe passes the roller 25 and permits the springs 26 to return the belt tightener 20 to its normal position, thereby stopping the rotation of the pulleys 31, 34 and 36.

A gate 46 is pivoted at the rear of the plunger head 14 (Figure 2) and extends upwardly therefrom. The gate is provided with trunnions 47 about midway thereof and these trunnions engage in guide channels 48 on each side of the gate at the rear of the frame 10. The gate is substantially as wide as the hopper 15 and by observing Figure 2, it is obvious that as the plunger head travels downwardly within the hopper and press box, the gate 46 will also travel downwardly to close the opening between the hopper and the chute 17. By pivoting the gate to the rear of the plunger head, cotton is prevented from working its way into the hopper above the head, for whenever the head is in a lowered position the gate is closed, and even after the head starts its upward travel, the gate travels therewith and due to its being pivoted as shown, prevents cotton from being swept into the hopper above the head by the kicker blade.

Assuming that the plunger 11 is in its lowermost position with the head 14 within the pressbox, it will be seen that the gate 46 is down and the chute 17 is closed off from the hopper. At this time the belt tightener is in its normal position with the roller 25 within the frame in the path of the shoe 19, and the belt 32 is loose on the pulleys 31 and 33, whereby the motion from the latter is not transmitted to the former. It is pointed out that with the belt tightener in its normal position, the brake shoe 40 is engaging the pulley 31.

As the plunger 11 starts its up stroke, the gate 46 carried by the plunger head travels upwardly to open communication between the chute 17 and hopper 15. When the plunger head 14 reaches a point in the hopper where it will not interfere with the operation of the kicker blade 38 the shoe 19, which is beveled at its upper end, strikes the roller 25 and swings the belt tightener under tension of the springs 26. The angle of the bevel at the upper end of the shoe 19 provides means for swinging the belt tightener 20 quickly. This provides a snap action whereby the pulley 31 is started to rotate immediately. The roller 22' on the ends of the levers 22 of said belt tightener will exert a pressure on the belt 32 and tighten the same on the pulleys 31 and 34. At the same time, the swinging of the belt tightener swings the lever 44, whereby the brake shoe 40 is disengaged from the pulley 31.

When the belt 32 is tightened on the rollers 31 and 34 motion is transmitted from the latter to the former and the shaft 30 is rotated. The rotation of the shaft 30 rotates the pulley 34 which in turn, drives the pulley 36 which revolves the kicker blade 38 to sweep the cotton into the hopper from the boot 17' of the chute 17. Thus, it will be seen that as the plunger head 14 reaches the top of the hopper the gate 46 is open and the kicker blade is revolving to sweep cotton into said hopper.

The plunger continues its upward travel and the shoe 19 remains in engagement with the roller 25 to hold the belt tightener in its outward position. When the plunger reaches the top of its stroke, the shoe still engages the roller and the plunger then starts downward. As the plunger head 13 reaches a point in the hopper, where it would interfere with the rotation of the kicker blade, the shoe 19 passes the roller 25 and the springs 26 swing the belt tightener 20 to its normal position. This swinging of the belt tightener releases the pressure on the belt and at the same time applies the brake shoe to the face of the pulley 31 to immediately stop the pulley which controls the operation of the kicker blade 38. As the plunger continues its downward travel, the gate 46 is closed and cotton in the chute cannot enter the hopper. Thus, it is seen that during the upper end of both the up and down stroke, or when the plunger head 14 is above a point in the hopper where it will not interfere with the kicker blade, said kicker blade is operated. However, it is immediately stopped when the head reaches the point in the hopper where said head would strike the rotating blade, and additional cotton is prevented from entering said hopper by the closing of the gate 46.

The particular position or size of the shoe 19 may be varied for it is possible to place the belt tightener anywhere on the frame so as to operate the kicker blade at any desired position of the plunger. The length of the shoe 19 controls the length of time which the kicker blade is operated.

The invention may easily be attached to a tramper which is already set up. It is only necessary to cut the slot 24 in the side of the frame channel 10' and mount the hanger 28 and belt tightener 20. The pulley 33 is then mounted on the shaft of the drive pulley 13 and the pulley 37 is secured on the kicker blade shaft 37. The belts are then placed in position on their respective pulleys and an efficient control is had. The gate 46 is readily attached to any plunger head of the usual type.

What I claim and desire to secure by Letters Patent, is:

1. A tramper feeder comprising, a shaft, a revoluble feeding member on the shaft, a pulley on the outer end of the shaft, a belt drive for said pulley, a belt tightener engaging the belt drive and arranged to be secured to the frame of a tramper, a shoe adapted to be secured to the plunger of said tramper for engaging the belt tightener to actuate the same to transmit motion to the pulley, and a brake directly connected with and actuated by the belt tightener for arresting the belt drive when the shoe disengages the belt tightener to release the same.

2. A tramper feeder comprising, a shaft, a revoluble feeding member on the shaft, a pulley on the outer end of the shaft, a second pulley arranged to be mounted on the frame of a tramper, a driving connection between the pulleys, a drive pulley mounted on the drive shaft of said tramper, an endless belt loosely mounted around the drive pulley and the second pulley, a belt tightener arranged to be secured to said frame of the tramper and engaging the belt, a shoe adapted to be secured to the plunger of said tramper for engaging the belt tightener to actuate the same, whereby motion is transmitted from the drive pulley to the pulley on the feeder shaft through the belt and driving connection, and a brake engaging the second pulley and directly connected with and actuated by the belt tightener for arresting said pulley when the belt tightener is released.

3. In a tramper feeder, the combination with the vertically reciprocating tramper plunger, and revoluble feeding member, and a belt drive for said member, of a belt tightener engaging the belt, means for actuating said tightener arranged to be operated by the plunger, and means directly connected with and actuated by the tightener to arrest the belt drive when the tightener is released.

4. In a tramper feeder, the combination with the vertically reciprocating tramper plunger and a belt drive for the feeder, of a belt tightener engaging the belt drive and arranged to be secured to the frame of a tramper, a shoe adapted to be secured to the plunger of said tramper for engaging the belt tightener to actuate the same, and a brake directly connected with and actuated by the belt tightener for arresting the belt drive when the tightener is released.

5. In a tramper feeder, the combination with a reciprocating plunger and a revoluble feeder, of a controlling mechanism comprising, a drive pulley, a drive belt passing over said pulley for imparting motion to the feeder, a pivoted belt tightener engaging the belt and arranged to tighten the belt, means on the plunger for swinging the tightener to tighten the belt, means for swinging the tightener to loosen the belt, whereby motion is not transmitted to the feeder, and means for stopping the rotation of the drive pulley when the tightener is swung to loosen the belt.

6. In a tramper feeder, the combination with a reciprocating plunger and a revoluble feeder, of a controlling mechanism comprising a hanger fastened to the frame of the tramper, a drive pulley journaled in said hanger, an endless belt passing over the pulley for transmitting motion to the feeder, a belt tightener hinged to the frame beneath the hanger and arranged to be actuated by the plunger of the tramper at the upper end of its stroke to loosen and tighten the belt on the pulley whereby motion transmitted to the feeder is controlled, and means connected with the tightener to stop the rotation of the pulley simultaneously with the loosening of the belt.

7. In a tramper feeder, the combination with a reciprocating plunger and a revoluble feeder, of a controlling mechanism comprising a hanger fastened to the frame of the tramper, a drive pulley journaled in said hanger, an endless belt passing over the pulley for transmitting motion to the feeder, a belt tightener hinged to the frame beneath the hanger and arranged to be actuated by the plunger of the tramper at the upper end of its stroke to loosen and tighten the belt on the pulley whereby motion transmitted to the feeder is controlled, and a swinging brake directly connected with and actuated by the tightener to immediately stop the rotation of the pulley when the belt is loosened.

8. The combination with the frame of a tramper, the vertical moving plunger and revoluble feeder, of a driving pulley carried by the frame, a driven pulley also carried by the frame, an endless belt loosely mounted on the driving and driven pulleys, a driving connection between the driven pulley and the feeder, a belt tightener pivotally mounted on the frame and engaging said belt, and a shoe carried by the plunger for engaging the belt tightener, whereby motion is transmitted from the driving pulley to the driven pulley and the feeder only when the shoe engages the tightener.

9. The combination with the frame of a tramper, the vertical moving plunger and revoluble feeder, of a driving pulley carried by the frame, a driven pulley also carried by the frame, an endless belt loosely mounted on the driving and driven pulleys, a driving connection between the driven pulley and the feeder, a belt tightener pivotally mounted on the frame and engaging said belt, and a shoe carried by the plunger for engaging the belt tightener, whereby motion is transmitted from the driving pulley to the driven pulley and the feeder only when the shoe engages the tightener, and a brake for the driven pulley arranged to be actuated by the tightener to stop the driven pulley when the tightener is released by the shoe.

BRONSON C. WOODFORD.